2,776,368
Patented Jan. 1, 1957

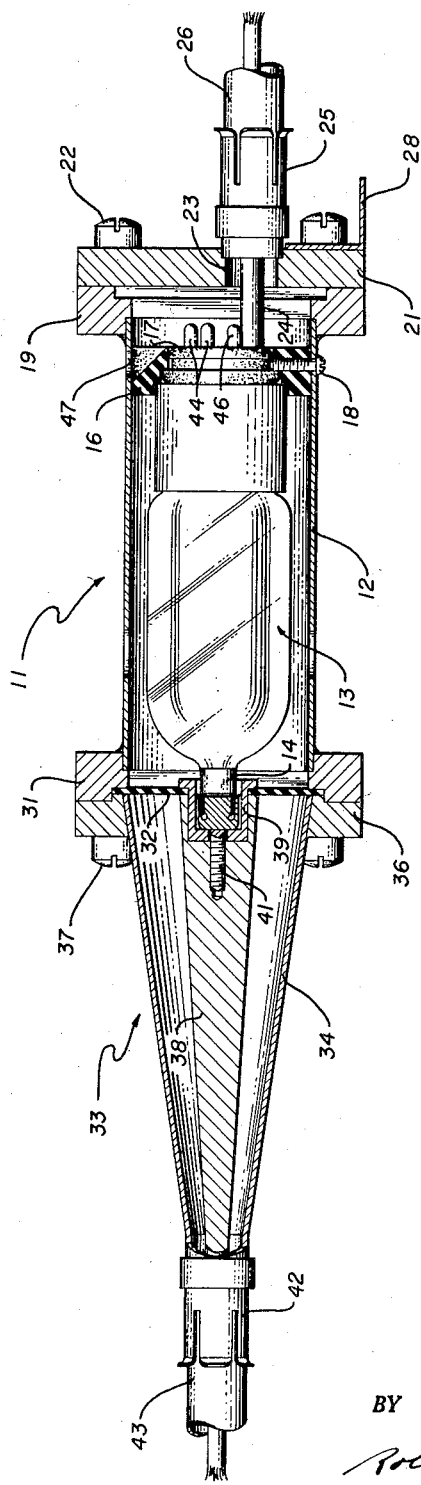

2,776,368

COAXIAL TUBE COUPLING

Harvey M. Owren and Vernon L. Smith, Livermore, and David R. Branum, Alameda, Calif., assignors to the United States of America as represented by the United States Atomic Energy Commission Application September 28, 1955, Serial No. 537,309

7 Claims. (Cl. 250—16)

The present invention relates to improved mounting means for vacuum and discharge tubes wherein coaxial continuity is effected so that mechanical coupling of a tube to transmission lines is facilitated and the electrical coupling thereof is improved.

Conventional methods of coupling tubes to coaxial transmission lines impose limitations upon the signals that can be effectively coupled from tube to line. For example, difficulties are experienced in the generation of high voltage pulses having a very fast rise time and applying same directly to a coaxial transmission line. The limitations in this instance are found to result from reflections in the plate circuit of the generator or output tube coupled to the line and undesirable coupling of plate and filament circuits of the tube.

By the present invention, a tube is effectively made a component of the transmission line insofar as impedance and matching characteristics are concerned so that the above-noted difficulties are substantially eliminated.

It is an object of the present invention to provide an improved means for coupling electronic valves to a coaxial transmission line.

It is another object of the present invention to provide a coaxial tube mounting for coupling tubes to a transmission line.

It is a further object of the present invention to provide tube mounting means having an outer shell and an inner conductor adapted to include a tube therein.

It is yet another object of the present invention to provide tube mounting means including an outer cylinder adapted to encompass a tube and an inner conductor adapted for connection to the tube with a tapered section adapted for connection to a transmission line.

A still further object of the present invention is to provide as a part of a coaxial transmission line an expanded section tapering outward from the line diameter and including means for mounting a tube coaxially therein.

Numerous other advantages and possible objects of the invention will become apparent to those skilled in the art from the following specification wherein the invention is described with respect to a gaseous discharge tube or thyratron, although the invention is in no wise limited to such tubes. A preferred embodiment of the invention is illustrated in the accompanying drawing wherein the sole figure is a sectional view of the tube mounting with a tube mounted therein and taken on the longitudinal axis of the mounting.

Considering now the structural details of the illustrated embodiment of the invention and referring to the drawing, the mounting 11 will be seen to include a central cylindrical housing 12 having a diameter larger than that of a tube 13 to be mounted therein and having vent holes in the wall thereof. It is contemplated that the tube secured in the mounting shall have an end connection 14 for the plate electrode thereof and the tube is fixed within the housing by means of a transverse mounting plate 16 encompassing a tube socket 17 formed of insulating material and into which the tube base prongs extend in mating relation to openings therethrough. The mounting plate 16 and tube socket 17 are fixed within the cylinder 12 by screws 18 extending through the cylinder wall and mounting plate into contact with the tube socket, as shown.

At the base of the tube there is provided an external flange 19 about the cylinder 12 and an end plate 21 is attached thereto as by bolts 22 in closing relation to the cylinder end. An aperture 23 is formed transversely through the end plate 21 for the passage of an electrical connection to the cathode of the tube. Through this aperture there extends an electrically conducting extension 24 of the cathode pin into engagement with a coaxial connector 25 disposed in closing relation to the aperture and adapted for joinder to a coaxial transmission line 26 at the central conductor thereof, whereby output signals may be obtained from the cathode of the tube within the mounting 11. As further regards the base end of the mounting, there may be provided one or more support brackets 28 attached to the end plate 21 as by the bolts 22 for securing the tube mount 11 to a chassis or the like.

At the opposite or head end of the mount, the cylinder 12 is provided with another external flange 31 secured about the end thereof with an internal shoulder formed thereabout against which is pressed a retaining ring 32 formed of an insulating material, such as "teflon" or the like. A conical coaxial section 33 extends from this end of the cylinder 12 and includes an outer conical member 34 having a base diameter equal to that of the cylinder and a tip diameter substantially equal to that of the outer conductor of a coaxial cable adaped to be attached thereto. This outer cone 34 is affixed to the cylinder 12 by means of a ring 36 having a shoulder thereabout adapted to mate with the shoulder of the flange 31 and having a conically tapered inner surface engaging the outer cone 34 near the base thereof. Bolts 37 are provided through the ring 36 and threaded into the cylinder flange 31 for tightening the ring against the outer cone 34 and flange 31 whereby the former is tightly held against the latter through the support ring 32 therebetween. There is also provided a solid inner conductor 38 of the conical section 33 formed in the shape of a solid cone from an electrically conducting material. The large end of the inner conductor is held in contact with the support ring 32 by means of a cup 39 extending through the central ring aperture and having a flange extending radially outward from the cup rim for preventing the cup from passing entirely through the ring aperture. A cylindrical opening in the large end of the inner conductor 38 receives the cup 39 and a screw 41 through the cup axially into the central conductor fixes the relation of elements. The cup 39 has an internal diameter of such size that the cup accepts in resilient contact the anode cap 14 of the tube 13 so that good electrical contact is made from anode cap 14 through the cup, formed of metal, to the inner conductor of the conical section 33.

At the outer end of the conical section, the outer conductor 34 and the inner conductor 38 have diameters substantially equal to the diameters of outer and inner conductors respectively of a coaxial transmission line to which the conical section is adapted to be connected. There is provided at the small end of the conical section a coaxial connector 42 to which the conductors of the conical section are connected and which, in turn, is adapted to snap onto a coaxial line 43 for completing the above-noted connection.

With regard to the energization of the tube electrodes, a plate supply is connected to the tube anode through the transmission line 43 with the inner conductor 38 coupled to the positive power supply terminal and the outer conductor 34 to the negative power supply terminal. The tube cathode is returned to the negative side of the plate power supply by a suitable load resistor connected to the end of the transmission line 26 between inner and outer conductors thereof. The tube control electrode and filaments are energized at tube pins 44 and 46, respectively, from without the housing by suitable leads (not shown) extending through a radial aperture 47 in the housing 12 near the flange 19. A balancing and canceling network may be connected between filaments and cathode to prevent interaction of potentials thereof and the tube output is obtained from across the load resistor. Various other electrical connections of the tube are possible and, in the present illustration, a gaseous discharge tube is employed as a pulse generator. The coaxial tube mounting produces very fast transient response and, as an example, with a particular hydrogen thyratron in the coaxial tube mounting rise and decay times between ten and ninety percent of a 1500 volt square wave pulse were 0.007 microsecond, while a conventional circuit requires 0.030 microsecond or more. The above result was obtained for a pulse of 0.1 microsecond duration between ten percent levels across a fifty ohm load resistor with a 0.05 microsecond charging cable. It will be appreciated that with very short duration pulses the decrease in rise time here obtained is quite advantageous.

It will be seen from the foregoing description and accompanying drawing that there is provided by the present invention a means for tube mounting whereby the tube becomes a coaxial element adapted for connection to transmission lines without abrupt impedance variations so that undesirable signal reflections are minimized. As regards the conical section 33, same may be made of desired length with suitable impedance matching being obtained by employing the relationship:

$$138 \log_{10} \frac{D}{d} = Z$$

where:

$D$ = inside diameter of outer conductor 34
$d$ = outside diameter of inner conductor 38
$Z$ = unit impedance of coaxial line 43

It will be appreciated that inasmuch as the invention contemplates the inclusion of a tube as a coaxial element of a transmission line, it is necessary to employ a tube adapted thereto by having an end cap anode connection to enhance the symmetry of the arrangement. There are, of course, a wide variety of tubes having the above-noted physical configuration, and in the instance where pulses are to be generated by the tube a gaseous discharge tube may be employed.

What is claimed is:

1. Mounting means for a tube having an end anode connector comprising a cylindrical housing adapted for concentric disposition about said tube and fixing the latter therein, an end plate for said housing having apertures therein for passage of leads to tube elements, and a conical coaxial section having the outer portion connected to said housing and the inner portion connected to the end anode connector whereby impedance is matched from tube to transmission line adapted for connection to the tube anode through said conical section.

2. Tube mounting means comprising an electrically conducting cylindrical housing having a tube socket therein adapted to retain a tube coaxially within the cylinder, a coaxial connector, a coaxial section tapering outwardly from said connector to said cylinder with the inner conductor thereof having means adapted to engage the end cap of a tube mounted in said cylinder, and connecting means adjacent said tube socket for connection to tube prongs for energizing elements of said tube.

3. Mounting means for a tube comprising a cylindrical housing having external flanges about each end thereof, an end plate removably secured to one of said flanges in closing relation to a cylinder end and having apertures therethrough for tube leads, a conical coaxial section removably secured to the other cylinder end at the flange thereof, and connecting means for joining a tube end cap to the central conductor of said coaxial section.

4. Tube mounting means comprising a tapered coaxial section having conical inner and outer conductors, a coaxial connector at the small end of said section for joining same to a coaxial transmission line, a cylindrical housing joined to the large end of said section and extending axially from the outer conductor thereof, a tube socket disposed within said cylinder for mounting axially therein a tube having an anode cap, and means removably connecting the anode cap of said tube with the inner conductor of said section for minimum impedance mismatch between transmission line and tube connected by the tube mounting means.

5. A coaxial element comprising an electrically conducting cylinder, an insulating tube socket fixed within said cylinder, a discharge tube mounted axially within said cylinder engaging said tube socket and having an anode end cap, a coaxial section having the outer conductor thereof joined to said cylinder at one end thereof and said section tapering radially inward away from said cylinder to substantially the dimensions of a coaxial transmission line to which it is adapted to be joined, and means connecting the inner conductor of said coaxial section at the large end thereof to the anode cap of said tube whereby impedance mismatch between tube and transmission line is minimized.

6. Mounting means for an electronic valve having an end cap comprising an electrically conducting cylinder, insulating mounting means within said cylinder for mounting said valve coaxially therein, a conical coaxial section having a conical outer conductor joined at the large end thereof to an end of said cylinder adjacent the valve end cap and a conical inner conductor having the large end connected to the end cap of said valve, and a coaxial transmission line connector affixed to the small end of said conical coaxial section.

7. Tube mounting means as claimed in claim 6 further defined by the taper of said conical coaxial section at all points therealong satisfying the relationship $$138 \log_{10} \frac{D}{d} = Z$$

where D is the diameter of the outer conductor, $d$ is the diameter of the inner conductor, and Z is the unit impedance of the transmission line to which the connector is adapted to be connected.

No references cited.